United States Patent [19]

Falcon

[11] 4,297,891
[45] Nov. 3, 1981

[54] APPARATUS AND METHOD FOR PROTECTING A TRANSDUCER

[75] Inventor: Wayne J. Falcon, Duncan, Okla.

[73] Assignee: Halliburton Services, Duncan, Okla.

[21] Appl. No.: 111,242

[22] Filed: Jan. 11, 1980

[51] Int. Cl.³ .............................................. G01L 7/08
[52] U.S. Cl. ...................................... 73/756; 73/706
[58] Field of Search ........................... 73/756, 707, 706

[56] References Cited

U.S. PATENT DOCUMENTS

| | | | |
|---|---|---|---|
| 1,799,832 | 4/1931 | Rinne et al. | 73/756 |
| 1,836,682 | 12/1931 | Ray | 73/707 |
| 1,867,779 | 7/1932 | Thompson | 73/756 |
| 2,064,268 | 12/1936 | Parker | 73/707 |
| 2,147,031 | 2/1939 | Hastings et al. | 73/707 |
| 2,618,978 | 11/1952 | Ragland | 73/756 |
| 4,192,192 | 3/1980 | Schnell | 73/706 |
| 4,199,991 | 4/1980 | Kodama | 73/715 |

Primary Examiner—Donald O. Woodiel
Attorney, Agent, or Firm—John H. Tregoning; Joseph A. Walkowski; E. Harrison Gilbert, III

[57] ABSTRACT

A system for protecting a transducer connected thereto by damping, through a pressurized fluid, a signal to be converted by the transducer is disclosed. The system includes a transducer protector apparatus having a housing and an element for damping the signal to be converted by the transducer. The housing includes a first connector for coupling with the transducible signal source and a second connector for joining the transducer. The housing also has a fluid-containing cavity and a member for transferring to the fluid in the cavity the transducible signal received through the first connector. The damping element includes a bore defined in the housing to directly communicate the cavity with an aperture in the second connector and a pin, having a predetermined diameter less than the diameter of the bore, disposed within the bore. The transducer protector apparatus may also include a valve assembly disposed within the aperture of the second connector and may have a valve capping plug and retainer associated therewith. The system further includes a device for pressurizing the fluid contained within the transducer protector apparatus.

5 Claims, 3 Drawing Figures

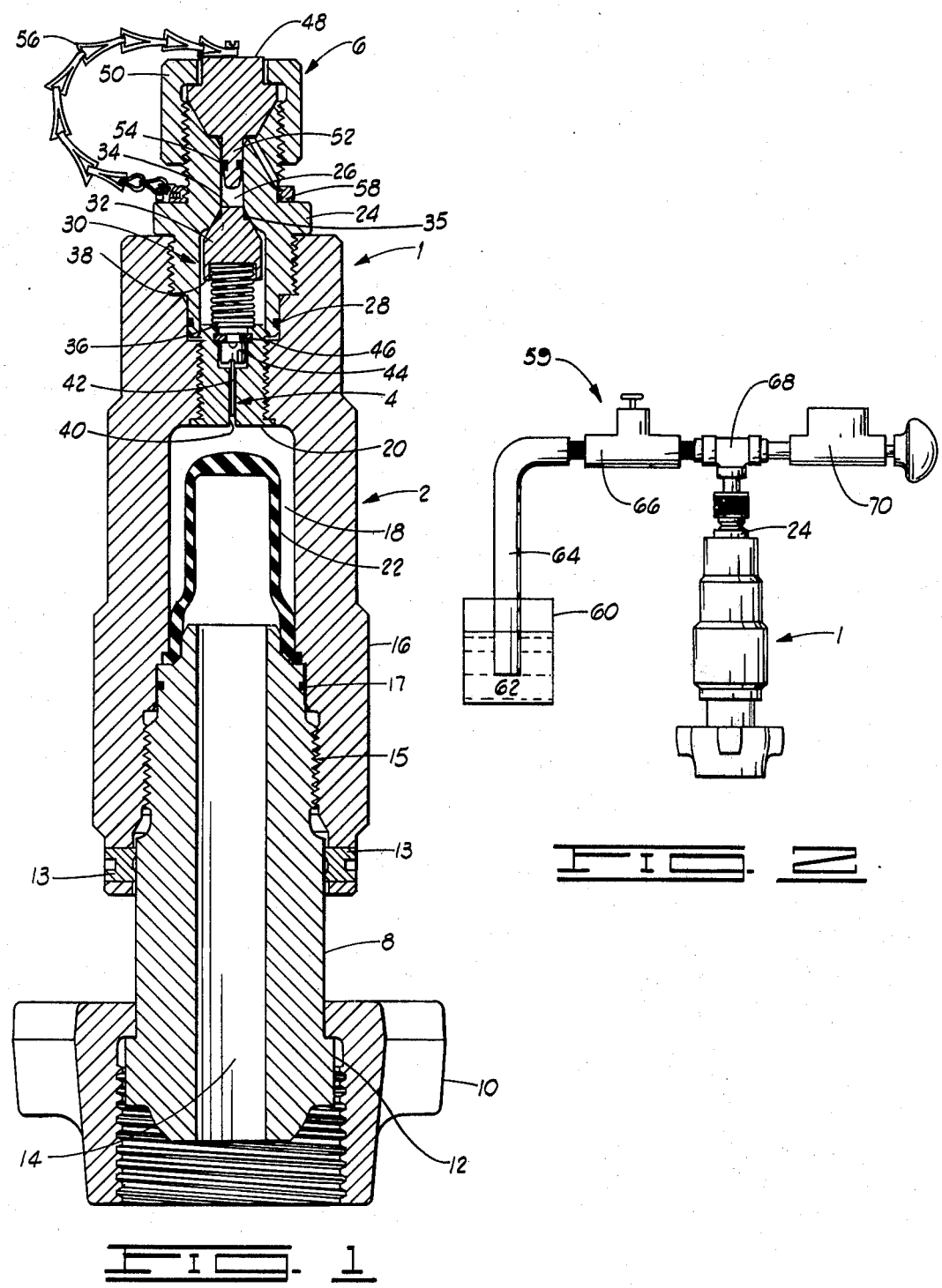

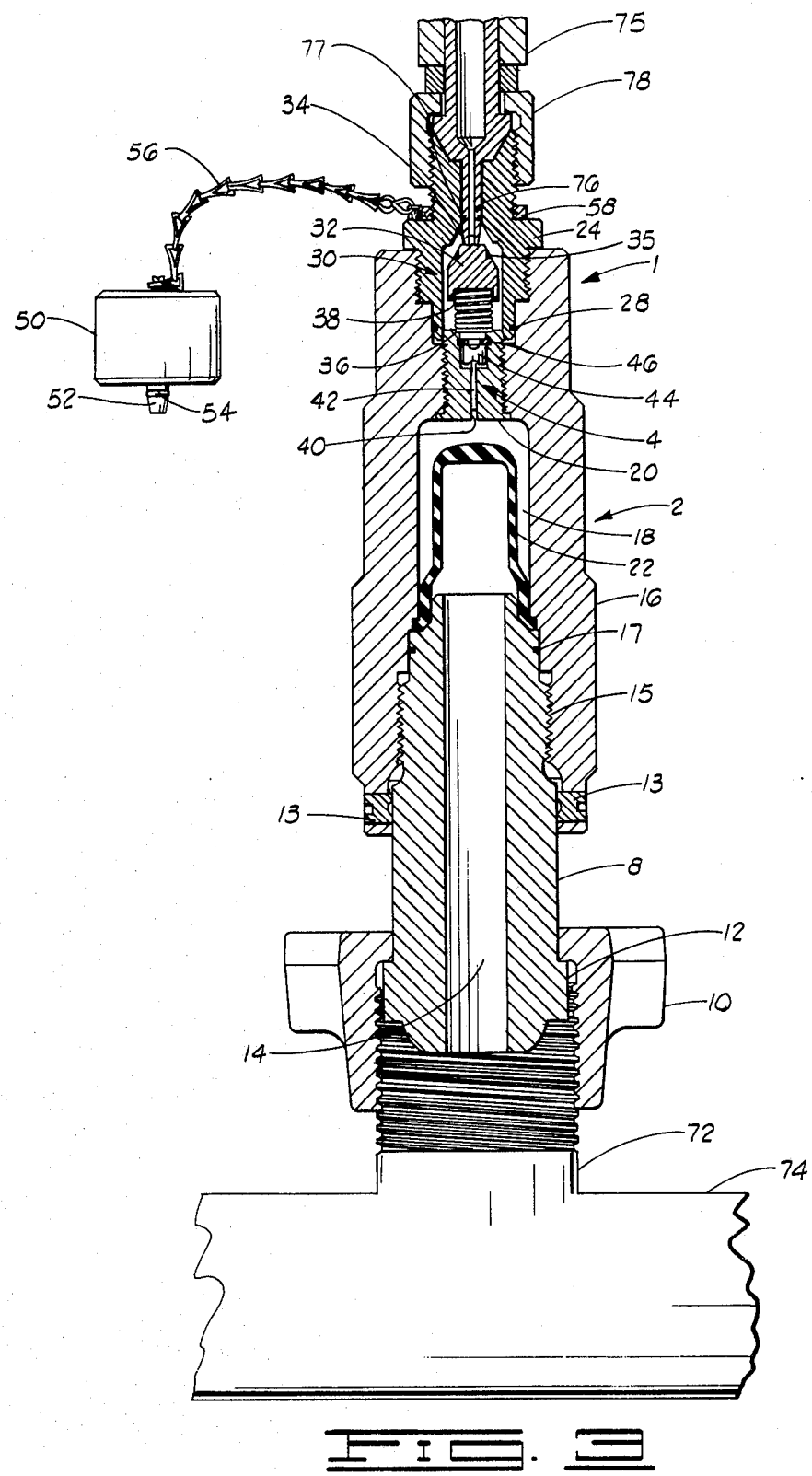

APPARATUS AND METHOD FOR PROTECTING A TRANSDUCER

This invention relates generally to apparatus for protecting transducers and more particularly, but not by way of limitation, to apparatus, connectible to a pipeline containing a fluid under pressure, for protecting a pressure transducer connected to the apparatus.

Generally, it is important to protect transducers which are used for monitoring various conditions in high stress environments, such as high pressure pipelines, gas well tubing, and fracturing and acidizing equipment, from the maximum stresses which may be encountered therein so that the transducers will remain functional.

More particularly, and by way of an example, in pumping a fluid through a pipeline it is necessary to monitor the pressure within the pipeline by means of a pressure transducer. This monitoring is necessary because, for example, the pressure measurements obtained by the monitoring process can be used to determine the extent of erosion of the tubing within the pipeline, which tubing may be that which is used in a gas well. However, because of the relatively delicate nature of transducers used in the monitoring process, precautions need to be taken to prevent the transducer from receiving the full force of the pressure applied to pump the fluid through the pipeline. For example, in the previously mentioned gas well tubing such a force may result from the large pressure impulses which are generated by fracturing fluid pumps located upstream from the pipeline locations at which the transducers are to be connected to monitor the pipeline pressure. These precautions create the need for a transducer protector apparatus having a means for damping the pressure in the pipeline before it is received by the transducer. So the damping means may be properly controlled to give accurate measurements, it is important that the damping means communicate the damped pressure signal directly between the pipeline and the transducer.

In addition to being protected from the full force of the pressure in the pipeline, the transducer must be protected from breakage which may occur upon its connection to the pipeline. For example, it is a practice in the oil industry to first attach a transducer to a damping or connecting means and then to connect the latter to a manifold of a pipeline by banging the damping or connecting means with a sledge hammer. This hammering procedure is necessary to obtain a secure coupling between the pipeline to be monitored and the monitoring transducer; however, this often damages the transducer. Therefore, the protector apparatus which is used to connect the transducer to the pipeline must also have connector means which permit the protector apparatus to be first connected to the pipeline and then connected with the transducer so that the transducer will not be damaged when the protector apparatus is attached, such as by banging with a sledge hammer, to the pipeline.

Furthermore, there is the need for the connector means of the protector device to include means by which the transducer can be interchangeably connected to the device so that the transducer may be initially connected or subsequently changed without having to repressurize the protector device or to disconnect the entire protector apparatus from the pipeline. This is important because the necessary damping means of the protector apparatus may contain a pressurized fluid which would require a time-consuming repressurization if the protector apparatus did not include such a means. Further, if the apparatus had to be disconnected from the manifold of the pipeline to which it was connected prior to interchanging the transducer, the manifold of the pipeline would have to be repressurized upon reconnection of the apparatus because the manifold pressure would have to have been reduced prior to the disconnection to prevent the pressurized fluid contained within the manifold from spewing out upon the disconnection of the protector apparatus.

The present invention fulfills these needs by providing a transducer protector apparatus which damps the pressure from the pipeline, or other transducible signal from its source. The present invention further provides means for connecting the protector apparatus first to the pipeline and then to the transducer. The connecting means further permits the transducer to be initially connected thereto or subsequently interchanged therefrom without having to disconnect the entire protector apparatus from the pipeline, and thereby without having to depressurize and repressurize the manifold with which the apparatus may be used. The transducer may also be installed or interchanged without having to repressurize any pressurized fluid which may be contained within the damping means of the present invention. Furthermore, the present invention directly communicates the damped pressure signal to the transducer for accurate control of the damping. Additionally, the present invention may be used in conjunction with the transducer and an electrical readout device to measure pressure to determine the extent of erosion of tubing in gas wells. It may also be used with acidizing or fracturing equipment, or in any other suitable environment, such as wherever pressure monitoring is to be done.

In general the transducer protector apparatus comprises a housing and a damping means. The housing includes a first connector means for connecting the housing to a source providing a transducible signal, such as a pressure wave, which is to be converted by a transducer. The housing further includes a second connector means, having an aperture defined therethrough, for connecting the housing to the transducer. Furthermore, there is a cavity, having an open end communicating with the first connector means, defined in the housing.

The damping means includes a bore having a predetermined diameter extending directly through the housing between the cavity and the aperture of the second connector means. The damping means further includes a pin, having a predetermined diameter which is less than the diameter of the bore, disposed within the bore so that the signal from the source is damped as it passes along the pin through the space existing between the wall of the bore and the lesser diametered pin.

The protector apparatus further comprises a valve included within the second connector means for sealingly engaging a portion of the aperture of the second connector means when the transducer is not connected thereto. The present invention further includes a valve capping means for preventing premature opening of the valve. The present invention also comprises first section and a second section and a signal transferring means disposed therebetween included within the housing.

This transducer protector apparatus is part of a system of the present invention for protecting a transducer connected thereto by damping, through a pressurized fluid, a signal to be converted by the transducer.

Therefore, the present invention provides a novel, useful and improved transducer protector apparatus and system. The objects, features and advantages of the present invention will be readily apparent to those skilled in the art when the following description of the preferred embodiment of the present invention is read in conjunction with the accompanying drawings.

FIG. 1 is a sectional view of the transducer protector apparatus of the present invention.

FIG. 2 is a schematic illustration of the transducer protector apparatus and pressurizing means of the present invention.

FIG. 3 is a sectional illustration of the transducer protector apparatus connected to the manifold of a pipeline and to a transducer.

Referring now to the drawings and particularly to FIG. 1, the preferred embodiment of a transducer protector apparatus 1, constructed in accordance with the present invention, will be described. Although the protector apparatus of the present invention may be used with any suitable transducer and transducible signal source, it will be assumed for purposes of the following discussion that the transducer is a pressure transducer and that the transducible signal source is a pressure source such as a gas well and pipeline system. FIG. 1 indicates that the apparatus 1 includes a housing 2, a damping means 4, and a valve capping means 6.

The housing 2 includes a first housing section 8 having a first connector means 10, such as a wing nut, retained thereon, such as by a flange 12. The first connector means 10 is used to connect the protector apparatus to the pipeline, or other source which provides the transducible signal which is to be converted by a transducer. FIG. 1 further shows that the first housing section 8 includes a channel 14 extending between the ends of the section 8 for communicating a portion of the pressurized fluid within the signal source to the interior of the housing 2. FIG. 1 additionally shows that the first housing section 8 is a male section having threaded portion 15 for threadedly engaging a female section provided by a second housing section 16 of the housing 2. Engagement between the two sections is also effected by means of set screws 13. A fluid-tight seal between the engaged sections is maintained by means of an O-ring 17.

The second housing section 16 includes a cavity 18 having an open end which communicates with the first connector means 10. In the preferred embodiment shown in FIG. 1, this communication occurs through the channel 14 of the first housing section 8. The cavity 18 contains a fluid for providing a medium through which the pressure signal, or other transducible signal to be converted by the transducer, may be transferred for damping by the damping means 4. In the preferred embodiment the bottom surface of the cavity 18 is defined by a sleeve 20 threadedly engaged in a sleeve-receiving portion of the second housing section 16.

The housing 2 further includes a pressure, or other transducible signal, transferring member 22. In the preferred embodiment this transferring means 22 is a rubber diaphragm disposed between the first connector means 10 and the cavity 18 for receiving the pressure signal from the pressure source and transmitting it through the cavity. More particularly, FIG. 1 indicates that the transferring means 22 is secured in position between the threadedly engaged first housing section 8 and second housing section 16 within the fluid-containing cavity 18 so that the means 22 receives the pressure waves from the pressure source and transmits them to the fluid within the fluid-containing cavity 18. This transmission occurs because the preferred embodiment rubber diaphragm of the transferring means 22 expands and contracts in response to the pressure signal received through the first connector means 10 and the channel 14 from the pressure signal source pipeline.

The housing 2 further includes a second connector means 24 having an aperture 26 defined therethrough. In the preferred embodiment shown in FIG. 1 the aperture 26 extends longitudinally from a first end of the connector means 24 to a second end thereof and has at least one neck portion connecting a smaller diametered portion to a larger diametered portion of the aperture. The first end of the second connector means 24 is threaded for connecting with the transducer. The second end of the connector means 24 threadedly connects to that end of the second housing section 16 which is opposite the section 16 end which is threadedly engaged with the first housing section 8. This connection between the second connector means 24 and the second housing section 16 is made fluid-tight by means of an O-ring 28 as shown in FIG. 1. Included within the second connector means 24 is a valve assembly 30 shown in FIG. 1 to be disposed within the aperture 26.

The valve assembly 30 includes a valve element 32, such as a check valve, movably disposed within the aperture 26 so that a sealing end 34, having an O-ring 35 associated therewith, of the element 32 sealingly engages a portion of the wall defining the aperture 26 when the element 32 is in the position shown in FIG. 1. In particular, in this position the sealing end 34 engages the previously mentioned neck portion of the aperture 26. The valve assembly 30 also includes a biasing element 36, such as a spring, extending between a base end 38 of the element 32 and the sleeve 20 which is threadedly engaged in the second housing section 16. When the transducer is not connected to the protector apparatus 1, the valve element 32 is biased by the biasing element 36 to sealingly engage a portion of the wall which defines the aperture 26 so that the pressurized fluid within the protector apparatus does not escape through the external opening of the aperture 26 at the first end of the second connector means 24. This valve assembly permits the transducer to be changed without removing the protector apparatus 1 from the pipeline. The valve assembly also enables the transducer protector to be connected to the pipeline without damaging the transducer.

The damping means 4 protects the transducer from the full magnitude of the transducible signal when the transducer is connected to the second connector means 24 by damping the signal from the signal source, such as the previously mentioned pressurized fluid pipeline, to which the first connector means 10 is connected. The damping means 4 includes a bore 40 having a predetermined diameter extending through the housing 2 between the cavity 18 and the aperture 26 of the second connector means 24. More particularly, the bore extends longitudinally through the sleeve 20 to directly communicate the fluid-containing cavity 18 with the aperture 26. This direct communication path, whereby the propagation of the transducible signal through the protector apparatus 1 is along a substantially straight path, enhances the accuracy with which the amount of damping can be controlled.

The damping means 4 also includes a pin 42 having a predetermined diameter which is less than the predetermined diameter of the bore 40 so that when the pin 42 is disposed within the bore 40 there is a space between the pin and the wall of the bore. The pin 42 acts as a metering element to meter the amount of fluid extending through the bore 40 between the cavity 18 and the aperture 26, and in so metering the pin may have at least one of a plurality of preselectable predetermined diameters, each of which preselectable diameters is less than the predetermined diameter of the bore 40. In the preferred embodiment shown in FIG. 1 the pin 42 is disposed substantially coaxially within the bore 40 so that the signal from the pressure source is damped as it passes along the pin 42 through the space existing between the wall of the bore 40 and the lesser diametered pin 42. By using pins having different diameters, the degree of damping can be variably controlled, or metered. That is, for a pin having a first diameter, the amplitude of the pressure pulse permitted to pass through the bore 40 will have a first magnitude, whereas for a pin having a second diameter, the amplitude will have a different, second value. In the FIG. 1 preferred embodiment the pin 42 is held in place by a pin retaining block 44 connected thereto. The pin 42 and block 44 assembly is held in place within the sleeve 20 by means of a retaining ring 46 as shown in FIG. 1. The block 44 is notched at both ends.

The damping means further includes a fluid contained in the space between the pin 42 and the bore for providing a continuous fluid path through which the pressure waves, or other transducible signal, transmitted by the pressure transferring means 22 can dampingly pass around the pin 42 to the aperture 26 of the second connector means 24. So that the fluid may pass completely through the sleeve 20, the notches in the pin retaining block 44 have been provided. The notch in the block 44 adjacent the retaining ring 46 permits the fluid to pass by the retaining ring 46 and into the aperture 26 within the second connector means 24.

The valve capping means 6 is used to prevent the premature opening of the valve element 32 when the transducer is not connected to the second connector means 24. The capping means 6 includes a plug 48 removably positioned in the external end of the aperture 26 of the second connector means 24 when the pressure transducer is not connected to the second connector means. The capping means 6 also includes means 50 for releasably retaining the plug 48 in the aperture 26. In the FIG. 1 preferred embodiment the plug 48 is shown to have a protuberant portion 52 which engages a portion of the wall of the aperture 26 in a fluid-tight seal by means of an O-ring 54 encircling the protuberant portion 52. Also in the preferred embodiment the retaining means 50 is a hand union nut which threadedly engages the outer stem at the first end of the second connector means 24. To prevent the plug 48 and the retaining means 50 from being lost, the capping means further includes a retaining strap 56, such as a chain, and a coupling collar 58 for securing the plug 48 and the retaining means 50 to the second connector means 24.

In addition to providing the transducer protector apparatus 1 described above, the present invention provides a system for protecting a transducer connected thereto by damping, through a pressurized fluid, a signal to be converted by the transducer. This system is illustrated in FIG. 2 and includes the transducer protector apparatus 1 as previously described and also means 59 for pressurizing the fluid contained in the cavity 18, in the space between the bore 40 and the pin 42, and in the aperture 26.

FIG. 2 discloses that the pressurizing means 59 includes a container 60 having a body 62 of the fluid contained therein. The pressurizing means further includes a duct 64 having a first end disposed in the body of fluid and having a second end connected to a first end of a valve 66, such as a needle valve. Connected to a second end of the valve 66 is a first end of a three-ended connector means 68. A second end of the three-ended connector means 68 is connected to the external threaded end of the second connector means 24 when the valve capping means 6 has been removed therefrom. The pressurizing means 50 further includes a pump 70 connected to a third end of the three-ended connector means 68. The pump 70 is used for pumping the fluid between the container 60 and the protector apparatus 1 when the components are connected as shown in FIG. 2. The pumping action of the pump 70 pressurizes the fluid contained within the protector apparatus 1.

Once the transducer protector apparatus 1 has been pressurized (if it is to contain a pressurized substance), it is ready for installation at the appropriate monitoring location as indicated in FIG. 3. Such a location may be manifold 72 of a pipeline 74 carrying a pressurized fluid. After the installation has been made by connecting the first connector means 10 to the manifold 72, such as by sledge hammering the connector 10, a transducer 75, as partially shown in FIG. 3, may be connected to the second connector means 24 by inserting a probe 76 of the transducer into the aperture 26 and then tightening an engaging means, such as a hand union nut 78, to the second connector means 24, a fluid-tight seal being effected between probe 76 and second connector means 24 by O-ring 77. The bore of transducer probe 76 is, of course, filled with a fluid prior to insertion into transducer protector appratus 1 and the tip of probe 76 is notched across the bore to permit fluid communication between transducer 75 and transducer protector apparatus 1 when probe 76 abuts sealing end 34.

With reference again to FIG. 1, the operation of the protector apparatus 1 will be described. Once the first connector means 10 has been connected to the pipeline containing the pressurized fluid to be monitored, a portion of this fluid passes through the channel 14 and contacts the transferring means 22 so that the means 22 expands and contracts in response to the pressure changes in the monitored fluid. These expansions and contractions are transmitted to the fluid contained in the cavity 18 so that the resultant pressure fluctuations pass through the fluid in the cavity 18 into the bore 40 of the damping means 4. Damping occurs as the pressure waves pass along the pin 42 to the aperture 26 of the second connector means 24.

With the transducer connected to the external portion of the second connector means 24, the valve element 32 is slightly opened because the nose of the transducer extends far enough into the aperture 26 that it engages the sealing end 34 of the valve element 32 and depresses it against the biasing element 36. Because of this interaction between the transducer and the valve 32, the damped pressure signal exiting the damping means 4 passes through the aperture 26 and around the valve 32 and contacts the probe of the transducer. Thus, the transducer can detect the damped signal and convert it into a corresponding electrical signal for controlling a readout device.

The method by which this operation is accomplished so that a transducer is protected from damage in monitoring a fluid pumped under pressure through a conduit comprises the following steps. First, there is the step of obtaining a transducer protector apparatus of the type described hereinabove. That is, this apparatus is one including a first connector means 10, a second connector means 24 having a first valve 32 in sealing engagement with the wall of an aperture 26 disposed within the second connector means, a pressure wave damping means 4, a valve capping means 6, and a pressurized fluid. Next, the first connector means 10 of the protector apparatus is attached to the conduit. The valve capping means 6 is removed from the transducer protector apparatus and the pressure transducer is coupled to the second connector means 24 so that the valve 32 is dislodged from its sealing engagement with the wall of the aperture 26 to permit communication of the pressurized fluid with the transducer as shown in FIG. 3.

The step of obtaining a transducer protector apparatus includes the steps of installing the valve capping means 6 in one end of the aperture 26 at the first end of the second connector means 24 and connecting the second end of the second connector means 24 to the second housing section 16 having the cavity 18 defined therein. The next step is that of placing the valve assembly, having the valve element 32, through the other end of the aperture 26 for sealingly engaging a portion of the aperture. With the valve so placed, the portion of the aperture extending between the sealingly engaged valve element 32 and the cavity 18 is filled with the previously mentioned fluid which may be an oil or gel, or any other suitable substance, as is known in the art. This filling step is continued until the fluid reaches a first predetermined location which is the end of the threaded portion of the second housing section 16 where the top of the sleeve 20 defines the bottom surface of the cavity 18. The method of obtaining the protector apparatus further includes the steps of inserting the sleeve 20, having the bore 40 defined therethrough and the pin 42 and block 44 retained therein by the ring 46, into the second housing section 16 so that it extends between the second end of the second connector means 24 and the first predetermined location so that the bottom surface of the cavity 18 is thereby defined. Next, the cavity 18 is filled with the fluid to a second predetermined location, defined in the preferred embodiment to be approximately one-third of the distance from the bottom surface of the cavity 18 to the opening at the top thereof, and the pressure transferring member 22 is installed in the second housing portion 16. After this, the first housing section 8 is joined to the second housing section 16 so that the pressure transferring member 22 is retained therebetween. Finally, the fluid within the aperture 26, the bore 40 and the cavity 18 is pressurized.

This step of pressurizing the fluid includes the following steps. First, the valve capping means 6 is disconnected from the aperture 26 of the second connector means 24. Then the second connector means 24 is engaged with a pressurizer system of the type having the pump 70, the container of fluid 60, and means for communicating the fluid therebetween through the valve 66. With the protector apparatus 1 so engaged with the pressurizer system, the pump 70 is actuated to increase the pressure of the fluid within the transducer protector apparatus to a first pressure level. For example, the first pressure level might be between ten and fifteen pounds per square inch. Once this first pressure level has been attained, the valve 66 is opened to release the air contained within the pressurizing system. With the valve 66 open, the actuating of the pump 70 is continued until all the air is released. Once the air has been released, the valve 66 is closed and the actuating of the pump is further continued until the pressure of the fluid within the transducer protector apparatus 1 increases to a second pressure level, such as approximately thirty pounds per square inch. When this second level has been obtained, the second connector means 24 is disengaged from the pressurizing system and the valve capping means 6 is replaced in the aperture 26 of the second connector means 24.

From the preceding description it is apparent, in view of the valve assembly, for example, that the present invention of an apparatus and method for protecting a transducer permits the transducer to be connected to the protector apparatus after the protector apparatus has been secured to the transducible signal source. This sequence of connections protects the transducer from any damage which might otherwise occur during such installation of the protector apparatus if the transducer had to be first connected to the protector apparatus. Furthermore, the present invention permits a damaged transducer to be replaced without having to disconnect the entire protector apparatus from the signal source because the valve 32 is biased shut by the biasing means 36 whenever the transducer is disconnected from the protector apparatus, thereby preventing the loss of the pressurization of the fluid within the apparatus. The present invention also protects the transducer from high levels of pressure by providing a damping means. Thus, the present invention is well adapted to fulfill the needs mentioned above and to carry out the objects and attain the ends and advantages inherent therein. While preferred embodiments of the invention have been described for the purpose of this disclosure, numerous changes in the construction, arrangement of parts, and operating parameters (e.g., pressure levels) can be made by those skilled in the art, which changes are encompassed within the spirit of this invention as defined by the appended claims.

What is claimed is:

1. A system for protecting a transducer connected thereto by damping, through a pressurized fluid, a signal to be converted by the transducer, said system comprising:

a transducer protector apparatus, including:
   a housing, including:
   a first connector means for connecting said housing with the transducer, said second connector means having an aperture defined therethrough;
   a fluid-containing cavity defined within said housing; and
   a transducible signal transferring means disposed within said fluid-containing cavity for receiving the transducible signal from the source and for transmitting it to the fluid in said fluid-containing cavity; and
   damping means for damping the signal transmitted by said transferring means, said damping means including:
   a bore having a predetermined diameter defined in said housing, said bore communicating said fluid-containing cavity with said aperture in said second connector means;

a pin having a predetermined diameter which is less than the predetermined diameter of said bore, said pin disposed within said bore so that a space exists between said pin and the wall of said bore; and a fluid contained in said space for providing a continuous fluid path through which the transducible signal transmitted by said signal transferring means can dampingly pass around said pin to the aperture of said first connector means; and means for pressurizing the fluid in said cavity and in the space between said bore and said pin, said means for pressurizing the fluid including:

a container having a body of the fluid contained therein;

a duct having a first end thereof disposed in said body of fluid;

a valve having a first end connected to a second end of said duct;

a three-ended connector means having a first end connected to a second end of said valve and a second end connected to said second connector means of said housing; and a pump connected to a third end of said three-ended connector means for pumping fluid between said container and said protector apparatus so that the fluid within said protector apparatus is thereby pressurized.

2. A method of connecting a pressure transducer to a conduit, through which conduit a fluid is pumped under pressure, so that the transducer is protected from damage, said method comprising the steps of:

obtaining a transducer protector apparatus of the type including a first connector means, a second connector means having a first valve in sealing engagement with an aperture disposed in said second connector means, a pressure wave damping means, a valve capping means, and a pressurized fluid therein, said step of obtaining a transducer protector apparatus including the steps of:

installing the valve capping means in one end of the aperture at a first end of the second connector means;

connecting a second end of the second connector means to a second housing section having a cavity defined therein;

placing the first valve through the other end of the aperture for sealingly engaging a portion thereof;

filling the portion of the aperture extending between the sealingly engaged first alve and a sleeve-receiving portion of the second housing section and also filling the sleeve-receiving portion of the second housing section to a first predetermined location with a fluid;

inserting a sleeve, having a bore defined therethrough and a pin disposed therein, into the sleeve-receiving portion of the second housing portion so that it extends between the second connector means and the first predetermined location;

filling the cavity to a second predetermined location with the fluid;

installing a pressure transferring member in the second housing portion;

joining a first housing section, having the first connector means retained thereon, to the second housing section so that the pressure transferring member is retained therebetween; and pressurizing the fluid within the aperture, bore and cavity, said step of pressurizing the fluid including the steps of:

disconnecting the valve capping means from the aperture of the second connector means;

engaging the second connector means with a pressurizer system of the type having a pump, a container of fluid, and means for communicating the fluid therebetween through a second valve;

actuating the pump to increase the pressure of the fluid within the transducer protector apparatus to a first pressure level;

opening the second valve to release air contained within the pressurizing system;

continuing the actuating of the pump until all the air is released;

closing the second valve;

further continuing the actuating of the pump until the pressure of the fluid within the transducer protector apparatus increases to a second pressure level;

disengaging the second connector means from the pressurizing system; and replacing the valve capping means in the aperture of the second connector means;

attaching the first connector means to the conduit;

removing the valve capping means from the transducer protector apparatus; and coupling the pressure transducer to the second connector means so that the first valve is dislodged from its sealing engagement with the aperture to permit communication of the pressurized fluid with the transducer.

3. A pressure transducer protector apparatus, comprising:

a first housing section having a channel defined longitudinally therethrough and having a flange extending therefrom;

first connector means, retained on said first housing section by said flange, for connecting said housing to a pressure signal source;

pressure transferring means for expanding and contracting in response to a pressure signal received from the pressure signal source;

a sleeve having a bore of predetermined diameter defined longitudinally therethrough;

a second housing section having said sleeve threadedly engaged longitudinally therein to define a bottom surface of a cavity defined within said second housing section, said second housing section threadedly engaged with said first housing section so that said pressure transferring member is retained between said first and second housing sections within said cavity and is disposed between said channel of said first housing section and said bore of said sleeve;

second connector means, having an aperture defined longitudinally therethrough, threadedly connected to the end of said second housing section which is opposite the end of said second housing section with which said first housing section is threadedly engaged;

a metering element having at least one of a plurality of preselectable predetermined diameters, each of which preselectable predetermined diameters is less than the predetermined diameter of said bore defined in said sleeve, said metering element substantially coaxially disposed within said bore so that a pressure wave passing through the space existing between said metering element and the portion of said sleeve defining said bore is damped;

a check valve element disposed within said aperture of said second connector means, said check valve element having a sealing end for sealingly engaging a portion of said second connector means defining said aperture and having a base disposed opposite the sealing end; and a biasing element extending between the base of said check valve element and said sleeve having said metering element disposed therein.

4. An apparatus as defined in claim 3, further comprising check valve capping means for preventing premature opening of said check valve, said capping means including:

a plug removably positionable in said aperture of said second connector means; and means for releasably retaining said plug in said aperture.

5. An apparatus as defined in claim 3, further comprising a fluid contained in said aperture, said bore, and said cavity between the sealing end of said check valve element and said pressure transferring means.

* * * * *

UNITED STATES PATENT AND TRADEMARK OFFICE
CERTIFICATE OF CORRECTION

PATENT NO. : 4,297,891
DATED : November 3, 1981
INVENTOR(S) : Wayne J. Falcon

It is certified that error appears in the above-identified patent and that said Letters Patent are hereby corrected as shown below:

Column 8, line 52 (claim 1, line 8), insert between "with" and "the" --a transducible signal source; a second connector means for connecting said housing with--.

Signed and Sealed this

Seventeenth Day of August 1982

[SEAL]

Attest:

GERALD J. MOSSINGHOFF

Attesting Officer                Commissioner of Patents and Trademarks